United States Patent Office 2,958,292
Patented Nov. 1, 1960

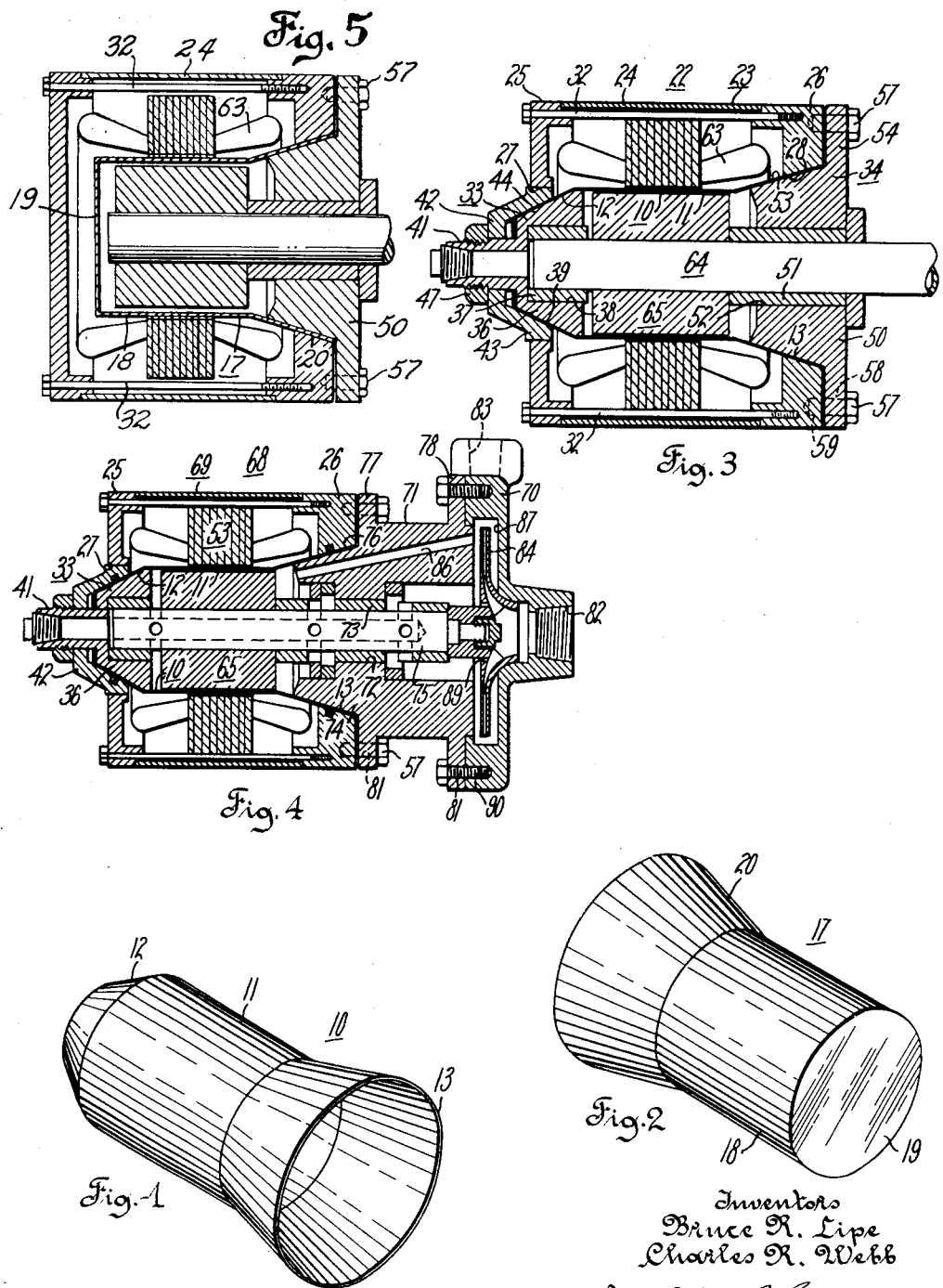

2,958,292

CANNED MOTOR

Bruce R. Lipe and Charles R. Webb, Cincinnati, Ohio, assignors to Allis-Chalmers Manufacturing Company, Milwaukee, Wis.

Filed Oct. 22, 1956, Ser. No. 617,635

13 Claims. (Cl. 103—87)

This invention relates generally to canned motors. More specifically, this invention relates to canned motors having a novel stator can construction.

A canned motor is a motor which literally has a canned rotor or a canned stator or both. The purpose of the can is to protect the winding in the rotor and in the stator by hydraulically sealing the windings in the rotor and/or the stator from fluid circulating through the motor. These motors have particular application in driving fluid handling devices such as pumps which are handling highly corrosive, precious or hazardous liquids under conditions which render ordinary hydraulic seals relatively ineffective and where such units cannot be given routine maintenance without stopping the motor. The cans in such motors protect the windings on the rotor and the stator from the liquid which leaks into the motor from the fluid handling device. In motor driven fluids handling devices such as a pump, there is bound to be some leakage of fluid through the wall between the motor and the pump through which the rotating shaft extends. In a canned motor pump unit the stator can is mounted in the motor housing, passes through the motor air gap and is generally closed around the end of the shaft. The shaft and motor rotor rotate within the can and the bearings supporting the shaft may also be positioned within the can. The fluid leaking from the pump is contained within the stator can and if possible returned to the lower pressure side of the pump to keep all the fluid within the pumping system. In such a motor pump unit the stator windings are hydraulically sealed from the fluid being pumped and no fluid leaks out of the pumping system.

In a canned motor pump unit the liquid being pumped can also be used to cool the motor by bypassing fluid from the discharge side of the pump around the rotor within the stator can and back to the intake side of the pump. Although canned motors are particularly adaptable for use with canned motor pump units or other fluid handling devices, they may also be used for any motor application in which containing liquid is a problem.

The big problem in building canned motors is in designing a suitable stator can. The stator can must be thin enough to fit into the air gap between the rotor and the stator and still be durable enough to resist the corrosive wear of the liquid circulating within the motor. Furthermore, the stator can must be mounted in the motor housing and positioned in the air gap to permit the rotor to rotate freely within the stator can without making contact with the stator can. Since the motor air gap is usually very small any misalignment between the rotor and the stator can will cause the rotor to rub against the can thereby causing a break in the can. As soon as a hole is worn into the stator can, it is incapable of performing its function of containing the fluid. Hence, the stator can must be mounted in the motor to be absolutely concentric with the rotor so that there is no contact between the rotor and the stator can while the motor is in operation.

In prior art canned motors the stator can was usually mounted in the motor housing while the shaft and rotor were mounted in bearings which in turn were positioned in bearing housings and mounted in the motor housing. The build up of manufacturing tolerances on the shaft, bearings, bearing housing and motor housing could cause a slight bearing misalignment which might result in damaging misalignment between the rotor and the stator can. Therefore in these prior art canned motors precision machining of the shaft, bearings, bearing housings and motor housing was necessary to assure perfect concentricity between the stator can and the rotor to avoid having the rotor rub on the stator can. Hence, the manufacturing cost of these prior art canned motors is very high.

The canned motor of this invention overcomes the problems of the prior art canned motors referred to above by calling for bearing means having externally tapered surfaces and a stator can having a generally cylindrical central section and end portions tapered complementary to the tapered surfaces of the bearing means. The end portions of this stator can are mounted on the complementary tapered surfaces of the bearing means. A motor housing having sections with surfaces tapered complementary to the tapered surfaces of the bearing means is then mounted on the tapered portions of the can and the bearing means.

In a structure such as that described above in which the tapered portions of the stator can are concentric, the bearings are concentric with the stator can and with each other. The shaft mounted in the bearing means is, within manufacturing tolerances, concentric with the bearing means and hence concentric with the stator can. The only misalignment between the rotor and the stator can that could occur would be due to the manufacturing tolerances on the rotor and the shaft. Obviously, the possibility of misalignment between the rotor and the stator can is considerably reduced. The ends of the stator can mounted between the tapered outer surface of the bearing means and the tapered inner surface of the motor housing are thin enough to serve as a gasket between the bearing means and the casing to hydraulically seal the stator from the rotor. Applicants' proposed structure has a further advantage in that the improved alignment of the bearings due to the stator can increases the bearing life.

Assembly and disassembly of this unit is easier than similar prior art units because tapered fits are used between the bearing housing and the motor housing rather than press fits.

Therefore, it is the object of this invention to provide a new and improved canned motor.

Another object of this invention is to provide a new and improved stator can for canned motors.

Another object of this invention is to provide a new and improved canned motor having better bearing alignment than prior art canned motors.

Another object of this invention is to provide a new and improved canned motor which is easier to assemble and more economical to manufacture.

Another object of this invention is to provide a new and improved canned motor having longer wearing bearing means.

Another object of this invention is to provide a new and improved canned motor pump unit.

Another object of this invention is to provide a new and improved canned motor fluids handling device in which there is no leakage from the fluids handling system.

Objects and advantages other than those set forth above will be apparent from the following description when read in connection with the accompanying drawings in which:

Fig. 1 is an isometric view of the preferred stator can of this invention;

Fig. 2 is an isometric view of a modified stator can of this invention;

Fig. 3 is a section view of a canned motor embodying the preferred stator can of this invention; and Fig. 4 is a section view of a canned motor pump unit embodying the preferred stator can of this invention.

Fig. 5 is a section view of a canned motor embodying the modified stator can of Fig. 2 of this invention.

The preferred stator can 10 of this invention as illustrated in Fig. 1 has an elongated generally cylindrical section 11 and tapered or flared portions 12, 13 at either end. The can 10 is very thin and is preferably made of a material having good corrosive resistant characteristics. The end portions 12, 13 of the can 10 are adapted to be mounted in a motor housing to position the cylindrical section 11 of the can 10 in the air gap of the motor and to align the cylindrical section of the can relative to the motor rotor. To this end the tapered portions 12, 13 and the cylindrical section 11 of the can 10 are manufactured precisely concentric and the tapered portions 12, 13 are adapted to be positioned between complementarily tapered portions of the bearing housings and the motor housing of a canned motor. The end portions 12, 13 of the stator can 10 may be tapered at any suitable angle. However, it is preferred that the angle of the taper on the front end 12 of the stator can be smaller than the angle of the taper on the open end 13 of the can to facilitate assembly of the can in a motor.

A modified stator can 17 of this invention is illustrated in Fig. 2. The modified can 17 has a generally cylindrical section 18 completely closed at one end 19 and a flared or tapered portion 20 at the open end of the cylindrical section. The stator can 17 is adapted to be mounted in a motor housing at only the flared end 20 and completely encloses the motor rotor and the end of the shaft upon which the motor is mounted. Stator cans, such as the can 17, are especially adaptable for use in very small motors.

A motor 22 embodying a stator can of this invention is illustrated in Fig. 3. The motor 22 has a housing 23 made up of a generally cylindrical shell section 24 and a front and rear cover 25, 26. The front cover 25 defines a cylindrical aperture 27 and the rear cover 26 defines a tapered aperture 28. The covers 25, 26 are adapted to be mounted on the shell portion 24 of the motor housing 23 by bolts 32. The motor 22 is provided with bearing means 33, 34 which are positionable within the apertures 27, 28, respectively.

The front bearing means 33 comprises a bearing housing 36 and a sleeve bearing 37. The front bearing housing 36 defines an axially extending bore 38 and has a tapered external surface 39. The sleeve bearing 37 is mounted in the bore 38 of the bearing housing 36. In the preferred embodiment as shown a threaded shank 41 extends axially outward from the front bearing housing 36 and an annular stator can supporting ring 42 is positioned over the shank 41. The can supporting ring 42 has a cylindrical external portion 43 which fits into the aperture 27 and an internal surface 44 which is tapered complementarily to the tapered external surface 39 of the front bearing housing 36. A nut 47 operatively engages the threaded shank 41 to mount the can supporting ring 42 on the front bearing housing 36. The assembly of the can supporting ring 42 and the front bearing means 33 is adapted to be mounted in the aperture 27 in the front cover 25. An alternate arrangement is to taper the aperture in the front cover to receive the tapered surface of the front bearing housing directly. In such a motor the can supporting ring is eliminated.

The rear bearing means 34 comprises a bearing housing 50 and a sleeve bearing 51. The rear bearing housing 50 has an axially extending bore 52 and an external surface 53 tapered complementarily to the tapered surface of the aperture 28 in the rear cover 26. The sleeve bearing 51 is mounted in the axially extending bore 52 of the rear bearing housing 50. The rear bearing housing is provided with an annular flange 54 extending radially outward from the tapered surface 53 for mounting the rear bearing housing on the rear cover 26. To this end bolts 57 are provided which extend through arcuately spaced holes 58 in the flange 52 and threadedly engage corresponding tapped holes 59 in the rear cover 26.

A stator winding 63 is mounted within the housing 23 of the motor 22 between the covers 25, 26. A shaft 64 having a motor rotor 65 mounted thereon is rotatably mounted in the bearings 37, 51 with the rotor positioned between the bearings. The rotor may be encased in a cylindrical can to protect the windings in the rotor from the fluid leaking into the motor. A stator can 10, such as the one shown in Fig. 1, is positioned in the air gap of the motor between the rotor 65 and the stator 63 with the tapered portions of the can 12, 13 mounted on the respective complementarily tapered surfaces 39, 53 of the bearing housing 36, 50. The tapered portions 12, 13 of the can 10 are manufactured precisely concentric. Therefore the bearing housings 36, 50 which are positioned in the tapered portions 12, 13 of the can 10 are also concentric. Hence the shaft 64 which is mounted in the bearings within the bearing housings 36, 50 and the rotor which is mounted on the shaft are concentric with the can 10 and can rotate within the can without coming into contact with the can. The can supporting ring 42 and the rear bearing housing 50 are mounted in the apertures 27, 28 of the covers 25, 26, respectively, to securely mount the can 10 in the motor 22. The tapered portions 12, 13 of the stator can 10 are preferably thin enough to act as gaskets between the can supporting ring 42 and the cover 26 and their respective bearing housings 36, 50 to hydraulically seal the rotor 65 from the stator. However, suitable sealing means such as O-rings may be positioned between the tapered portions 12, 13 and their respective bearing housings 36, 50 to aid in hydraulically sealing the rotor from the stator.

If a closed end stator can 17 such as the one shown in Fig. 2 were used in the motor rather than the double tapered stator can shown in Fig. 1, the front bearing assembly in the above described motor would be eliminated and the can 17 would be mounted in the motor solely between the rear cover and the rear bearing housing. Such a structure, which is illustrated in Fig. 5 would be especially adaptable for use in very small motors in which only one bearing would be used or in motors in which one bearing means would be located within the motor housing and the other bearing means would be located external to the motor housing.

The motor pump unit in Fig. 4 is illustrative of one of the many applications of a canned motor of this invention in connection with driving fluid handling devices. In such units where the motor shaft directly drives the fluid handling device, there is bound to be leakage through the wall of the fluid handling device through which the rotating shaft extends. Mechanical or packing type seals are relatively ineffective in preventing leakage in such applications and require periodic maintenance. If the fluid being handled is precious, hazardous or highly corrosive, it is imperative that the leakage of fluid from the fluid handling system be very closely controlled and eliminated, if possible. In the illustrated unit a stator can of this invention is mounted in the wall separating the motor and the fluid handling device to which the rotating shaft extends and controls the leakage of fluid through the separating wall by receiving and containing the fluid in the can. The fluid leaking through the wall is collected in the can and is fed back to the low pressure part of the fluid handling system.

Referring now in particular to the motor pump unit 68 illustrated in Fig. 4, the outer wall of the unit is divided generally into a motor housing 69, a centrifugal pump casing 70 and an intermediate member 71. The intermediate member 71 serves as a rear bearing housing for the motor and a backing plate for the pump casing 70. The intermediate member 71 defines an axially extending bore or passageway 72 between the motor housing 69 and the pump casing 70. A sleeve bearing 73 is positioned in the passageway 72 and a hollow shaft 75 is rotatably mounted therein. The rear bearing housing portion 74 of the intermediate member 71 has an outer surface 76 which is tapered to receive the complementarily tapered end 13 of the stator can 10. The intermediate member 71 has two external radially extending flanges 77, 78 which are axially spaced and have bolt holes 81 arcuately spaced around a circle near the periphery of the flanges. These flanges 77, 78 provide a means for mounting the intermediate members 71 on the rear cover of the motor housing 69 and on the pump casing 70, respectively. There is a clearance provided between the flange 77 and the rear cover of the motor to allow for positioning the rear bearing housing portion 74 of the intermediate member 71 within the flared end 13 of the stator can 10.

The remaining parts of the motor in the motor pump unit 68 are similar to corresponding parts in the motor 22 described above in connection with Fig. 3 and are identified by the same reference numbers.

The centrifugal pump casing 70 is mounted on the flange 78 of the intermediate member 71 and defines an axial inlet 82 and a radially spaced discharge aperture 83. An impeller 84 is mounted on the end of the shaft 75 extending into the centrifugal pump casing 70 and is positioned within the casing 70 axially spaced from the inlet 82. Suitable conduit means are provided for bypassing a portion of the fluid being pumped from the high pressure side of the pump into the stator can to cool the motor and lubricate and flush the bearings. In this particular motor pump unit a conduit 86 extends from the high pressure discharge volute 87 in the pump casing 70 through the intermediate member 71 into the stator can 10. A portion of the fluid being pumped is conducted from the high pressure side of the pump into the stator can 10 and around the rotor. The fluid in the stator can 10 flows from the can through the hollow shaft 75 and a bore 89 in the impeller back to the low pressure inlet side of the impeller 84.

When assembling the motor pump unit shown in Fig. 4 the stator 53 is mounted in the motor housing 69 and the front 25 and rear covers 26 are bolted into position. The front bearing means 33 are then positioned within the corresponding tapered end 11 of the stator can 10. The rotor 65 is then mounted on the shaft 75 and the intermediate member 71 is positioned over the shaft. The end of the shaft 75 on which the rotor is mounted and the rotor are then positioned within the stator can and the end of the shaft is rotatably mounted in the front bearing means 33. The rear bearing housing portion 74 of the intermediate member 71 is then positioned within the open end 13 of the stator can 10. The stator can 10 is positioned within the motor housing and intermediate member 71 is bolted on the rear cover 26 by bolts 57 extending through arcuately spaced holes 81 in the flange 78 and the can supporting ring 42 is mounted on the shank 41 of the front bearing housing 36 and positioned within the aperture 27 in the front cover 25. The impeller 84 is then mounted on the free end of the shaft 75 and the pump casing 70 is bolted on the flange 78 of the intermediate member by bolts 90. The can supporting ring 42 and the flange 77 of the intermediate member are then tightly mounted on the front bearing housing and the rear cover, respectively. As the can supporting ring and the intermediate member are tightened against the front bearing housing and the rear cover plate, respectively, the front tapered portion 12 of the can is squeezed between the front bearing housing 36 and the can supporting ring 42 and the rear tapered portion 13 of the can is squeezed between the rear bearing housing portion 74 of the intermediate member 71 and the rear cover 26 to hydraulically seal the stator 53 from the rotor 65.

In operation the motor is started and the fluid is drawn into the pump through the inlet 82. As the fluid is thrown outwardly by the impeller 84 into the high pressure zone in the discharge volute 87, some of the fluid flows through the conduit 86 to the interior of the stator can 10 and through the hollow shaft 75 and the bore 89 in the impeller 84 back to the low pressure side of the impeller 84. Fluid leaking from the pump to the motor through the passageway 72 in the intermediate member 71 is also returned from the stator can 10 to the low pressure side of the pump through the hollow shaft 75. The fluid which flows into the can serves to cool the motor and lubricate and flush the bearings.

Although but two embodiments have been illustrated and described, it will be apparent to those skilled in the art that various changes and modifications may be made therein without departing from the spirit of the invention or from the scope of the appended claims.

What is claimed is:

1. A canned motor comprising a housing defining a tapered aperture at one end, bearing means having an external surface tapered complementary to said aperture mounted in said aperture, a shaft rotatably mounted in said bearing means, a rotor mounted on said shaft and positioned within said housing, a stator mounted in said housing and encircling said rotor, a generally cylindrical stator can being closed at one end and having a tapered portion at the other end, said tapered portion being tapered complementary to the tapered surface of said bearing means, said can encasing said rotor and said flared end being mounted between the tapered surfaces of said bearing means and said aperture to align said can relative to said rotor and to hydraulically seal said stator from said rotor.

2. A canned motor comprising a housing defining a tapered aperture at either end, a pair of bearing means having an outer surface tapered complementary to the tapered surfaces of said apertures, said bearing means being positioned in said apertures, a shaft rotatably mounted in said bearing means, a rotor mounted on said shaft and positioned within said housing, a stator mounted in said housing and encircling said rotor, a stator can having a generally cylindrical central section and end portions tapered complementary to said tapered surfaces of said bearing means, said central section being positioned in the air gap between said rotor and said stator, said end portions being mounted between the tapered surfaces of said bearing means and said housing to align said central section relative to said rotor and hydraulically seal said stator from said rotor.

3. A canned motor comprising an elongated housing having front and rear covers, each of said covers defining a tapered aperture, said apertures being axially aligned and substantially parallel, a pair of axially spaced bearing means having substantially parallel outer surfaces tapered complementary to the tapered surfaces of said apertures, said bearing means being positioned in said apertures, a shaft rotatably mounted in said bearing means, a rotor mounted on said shaft and positioned within said housing, a stator mounted in said housing and encircling said rotor, a stator can having a generally cylindrical central section and end portions tapered complementary to said tapered surfaces of said bearing means, said central section being positioned in the air gap between said rotor and said stator, said end portions being mounted between the tapered surfaces of said bearing means and said housing to align said central section relative to said rotor and hydraulically seal said stator from said rotor.

4. A canned motor comprising a housing having a front and rear cover, said front cover defining a cylindrical aperture, said rear cover defining a tapered aperture axially aligned with said aperture in said front cover, a rear bearing housing having an external surface tapered complementary to said aperture in said rear cover, said rear bearing housing being positioned in said aperture in said rear cover, a front bearing housing having an external tapered surface, a can supporting ring having a cylindrical external portion and an internal surface tapered complementary to said tapered surface on said bearing housing, said can supporting ring being mounted on said bearing housing and positioned within said aperture in said front cover, bearings mounted in said bearing housings, a shaft journaled in said bearings, a rotor mounted on the end of said shaft intermediate said bearings, a stator mounted in said housing and encircling said rotor, a stator can having a generally cylindrical center section and end portions tapered complementary to the tapered apertures in said covers, said center section encircling said rotor and said tapered end portions being mounted between the tapered surfaces of said front bearing housing and said can supporting ring and said rear cover and said rear bearing housing to align said bearings and said central section and to hydraulically seal said stator from said rotor.

5. A motor fluid handling unit comprising in combination a motor housing defining a tapered aperture at one end, an intermediate member having an external surface tapered complementary to said aperture, said intermediate member being positioned in said complementarily tapered aperture and mounted on said housing, a fluid handling casing mounted on said intermediate member, said intermediate member defining a longitudinally extending bore communicating between said housing and said casing, bearing means mounted in said bore, a shaft journaled in said bearing means, a fluid handling device mounted on the end of the said shaft extending into said casing and a rotor mounted on the end of said shaft extending into said housing, a stator mounted in said housing and encircling said rotor, a generally cylindrical stator can having one end closed and the other end tapered complementary to the tapered surface of said intermediate member, the cylindrical portion of said can encircling said rotor and said tapered end of said can being mounted between the tapered surfaces of said housing and said intermediate member whereby said stator is hydraulically sealed from said rotor.

6. A motor fluids handling unit comprising in combination a motor housing having front and rear covers defining axially aligned tapered apertures, an intermediate member having an external surface tapered complementary to said aperture in said rear cover, the tapered portion of said intermediate member being positioned in said aperture in said rear cover, a casing mounted on the end of said intermediate member removed from said housing, said intermediate member defining a longitudinally extending bore communicating between said housing and said casing, a bearing housing having an external surface tapered complementary to said aperture in said front cover positioned in said aperture in said front cover, bearings mounted in said bore in said intermediate member and said bearing housing, a shaft journaled in said bearings, a fluids handling device mounted on the end of the said shaft extending into said casing and a rotor mounted on the end of said shaft extending into said housing, a stator mounted in said housing and encircling said rotor, a stator can having a generally cylindrical center section and end portions tapered complementary to the tapered apertures in said covers, said center section encircling said rotor and said tapered end portions being mounted between the tapered surfaces of said front cover and said bearing housing and said rear cover and said intermediate member to align said bearings and said central section and to hydraulically seal said stator from said rotor.

7. A motor fluids handling unit comprising in combination a motor housing having a front and rear cover, said front cover defining a cylindrical aperture, said rear cover defining a tapered aperture axially aligned with said aperture in said front cover, an intermediate member having an external surface tapered complementary to said aperture in said rear cover, the portion of said intermediate member having the tapered surface being positioned in said aperture in said rear cover, a fluids handling casing axially spaced from said housing and mounted on said intermediate member, said intermediate member defining a longitudinally extending bore communicating between said housing and said casing, a bearing housing having a tapered external surface and an outwardly extending threaded shank, a can supporting ring having a cylindrical external portion and an internal surface tapered complementary to said tapered surface on said bearing housing, said can supporting ring being on said shank and within said aperture in said front cover, an internally threaded nut operatively engaging said shank for mounting said ring on said bearing housing, bearings mounted in said bore in said intermediate member and said bearing housing, a shaft journaled in said bearings, a fluids handling device mounted on the end of the said shaft extending into said casing and a motor rotor mounted on the end of said shaft extending into said housing, a stator mounted in said housing and encircling said rotor, a stator can having a generally cylindrically center section and end portions tapered complementary to the tapered apertures in said covers, said center section encircling said rotor and said tapered end portions being mounted between the tapered surfaces of said can supporting ring and said bearing housing and said rear cover and said intermediate member to align said bearings and said central section and to hydraulically seal said stator from said rotor.

8. A pump unit comprising a housing defining a tapered aperture at one end, bearing means having an external surface tapered complementary to the tapered surface of said aperture positioned in said aperture, a shaft rotatably mounted in said bearing means, a rotor mounted on the end of said shaft positioned within said housing, a pump mounted on the other end of said shaft, a stator mounted in said housing and encircling said rotor, a generally cylindrical stator can being closed at one end and having a tapered portion at the other end, said tapered portion being tapered complementary to the tapered surface of said bearing means, said cylindrical section of said can encasing said rotor and said tapered end being mounted between the tapered surfaces of said bearing means and said housing to align said can relative to said rotor and to hydraulically seal said stator from said rotor.

9. A motor pump unit comprising in combination a motor housing having front and rear covers defining axially aligned tapered apertures, an intermediate member having a portion defining an external surface tapered complementary to said aperture in said rear cover, said tapered portion of said intermediate member being positioned in said aperture in said rear cover, a bearing housing having an external surface tapered complementary to said aperture in said front cover positioned in said aperture in said front cover, a casing defining a fluid intake and a radially spaced discharge aperture mounted on said intermediate member axially spaced from said housing, said intermediate member defining a longitudinally extending bore communicating between said motor housing and said casing, bearings mounted in said bearing housing and said bore in said intermediate member, a shaft journaled in said bearings, an impeller mounted on the end of the said shaft extending into said casing and positioned to face said inlet, a rotor mounted on the end of said shaft in said housing, a stator mounted in said housing and encircling said rotor, a stator can having a generally cylindrical center section and end portions tapered complementary to said apertures in said covers, said center section encircling said rotor and said tapered ends of said can being mounted between the tapered surfaces of said rear cover and said intermediate member and said front cover and said bearing housing to align said bearings and said central section and to hydraulically seal said stator from said rotor.

10. A motor pump unit comprising in combination a motor housing having a front and rear cover, said front cover defining a cylindrical aperture, said rear cover defining a tapered aperture axially aligned with said aperture in said front cover, an intermediate member having a portion defining an external surface tapered complementary to said aperture in said rear cover, said tapered portion of said intermediate member being positioned within said aperture in said rear cover, a bearing housing having a tapered external surface and an outwardly extending threaded shank, a can supporting ring having a cylindrical external portion and an internal surface tapered complementary to said tapered surface on said bearing housing, said can supporting ring being positioned on said shank and within said aperture in said front cover, an internally threaded nut operatively engaging said shank for mounting said ring on said bearing housing, a casing defining a fluid intake and a radially spaced discharge aperture mounted on said intermediate member axially spaced from said housing, said intermediate member defining a longitudinally extending bore communicating between said motor housing and said casing, bearings mounted in said bearing housing and said bore in said intermediate member, a shaft journaled in said bearings, an impeller mounted on the end of the said shaft extending into said casing and positioned to face said inlet, a rotor mounted on the end of said shaft in said housing, a stator mounted in said housing and encircling said rotor, a stator can having a generally cylindrical center section and end portions tapered complementary to said apertures in said covers, said center section encircling said rotor and said tapered ends of said can being mounted between the tapered surfaces of said rear cover and said intermediate member and said front cover and said bearing housing to align said bearings and said central section and to hydraulically seal said stator from said rotor.

11. A motor pump unit comprising in combination an outer wall member defining a pump casing and an axially spaced motor housing, said pump casing having an inlet and a radially spaced discharge aperture, said housing having a front cover defining a cylindrical aperture and a rear cover defining a tapered aperture, a front bearing housing, a tapered external surface and an axially extending threaded shank, a can supporting ring having a cylindrical external portion and an internal surface tapered complementary to said tapered surface in said front bearing housing, said can supporting ring being positioned within said aperture in said front cover and over said tapered portion of said front bearing housing, a nut threadedly engaging said shank for mounting said can supporting ring on said bearing housing, said intermediate member having an externally tapered bearing housing portion positioned within said aperture in said rear cover, said intermediate member defining a passageway communicating between said motor housing and said pump casing, bearings mounted in said passageway and said front bearing housing, a hollow shaft journaled in said bearings, an impeller mounted on one end of said shaft and positioned within said pump casing facing said inlet, a rotor mounted on said shaft intermediate said bearings and positioned in said housing, a stator mounted in said housing and encircling said rotor, a stator can having a generally cylindrical center section and end sections tapered complementary to the tapered external surfaces of said front bearing housing and said intermediate member, said center section of said can being positioned in the air gap between said stator and said rotor, said tapered ends being mounted between the complementary tapered surfaces of said can supporting ring and said front bearing housing and between said rear cover and said intermediate member to align said bearings and said central section of said can, sealing means interposed between said tapered ends and said bearing housings to hydraulically seal said stator from said rotor, said intermediate member defining a conduit from the discharge side of said pump casing to the interior of said can for bypassing some of the fluid being pumped from the discharge side of the pump casing to the interior of the can, and means for returning said bypassed fluid from said can to said pump through said hollow shaft.

12. A canned motor comprising a housing defining a tapered aperture at one end, bearing means having an external surface tapered complementary to the said tapered aperture mounted in said aperture, a shaft rotatably mounted in said bearing means, a rotor mounted on said shaft and positioned within said housing, a stator mounted in said housing and encircling said rotor, and a generally cylindrical stator can encasing said rotor and having one end portion tapered, said portion being tapered complementary to the tapered surface of the said bearing means, and mounted between the tapered surface of the said bearing means and the housing aperture to align said can relative to said rotor and to hydraulically seal said stator from said rotor.

13. A canned motor comprising a housing defining a tapered aperture at one end, bearing means having an external surface tapered complementary to said tapered aperture mounted in said aperture, a shaft rotatably mounted in said bearing means, a rotor mounted on said shaft and positioned within said housing, a stator mounted in said housing and encircling said rotor, a generally cylindrical stator can having one end portion tapered and means for closing the other end, said tapered portion being tapered complementary to the tapered surface of the said bearing means, said can encasing said rotor and said tapered end being mounted between the tapered surfaces of the said bearing means and housing aperture to align said can relative to said rotor and to hydraulically seal said stator from said rotor.

References Cited in the file of this patent

UNITED STATES PATENTS

| | | |
|---|---|---|
| 2,497,650 | Anderson | Feb. 14, 1950 |
| 2,649,049 | Pezzillo et al. | Aug. 18, 1953 |
| 2,669,187 | Guyer | Feb. 16, 1954 |
| 2,688,946 | Jarsaillon | Sept. 14, 1954 |
| 2,727,164 | Radice | Dec. 13, 1955 |

FOREIGN PATENTS

| | | |
|---|---|---|
| 284,177 | Switzerland | Nov. 17, 1952 |
| 1,049,446 | France | Dec. 29, 1953 |